United States Patent [19]

Mokveld

[11] Patent Number: 4,638,832
[45] Date of Patent: Jan. 27, 1987

[54] NONRETURN PISTON SLIDE VALVE

[75] Inventor: Nicolaas J. Mokveld, Reeuwijk, Netherlands

[73] Assignee: Mokveld Valves bv., Gouda, Netherlands

[21] Appl. No.: 217,213

[22] Filed: Dec. 17, 1980

Related U.S. Application Data

[63] Continuation-in-part of Ser. No. 37,054, May 8, 1979, abandoned.

[30] Foreign Application Priority Data

May 16, 1978 [DE] Fed. Rep. of Germany ....... 2821255

[51] Int. Cl.[4] ..................... F16K 17/30; F16K 21/10
[52] U.S. Cl. .............................. 137/220; 137/484.6; 137/514.5
[58] Field of Search ............... 137/220, 514, 514.5, 137/543.19, 484.2, 484.6, 514.3, 514.7

[56] References Cited

U.S. PATENT DOCUMENTS

| | | | |
|---|---|---|---|
| 154,177 | 8/1874 | Flanders | 137/514.5 |
| 867,702 | 10/1907 | Clarke | 137/514.5 |
| 1,252,940 | 1/1918 | Osborne | 137/514.5 |
| 1,754,975 | 4/1930 | Andersen | 137/514.5 |
| 1,802,720 | 4/1931 | Junkers | 137/220 UX |
| 2,710,021 | 6/1955 | Jones | 137/514.5 |
| 3,027,913 | 4/1962 | Chatham | 137/514.5 X |
| 3,134,394 | 5/1964 | Ohta | 139/220 |
| 3,465,778 | 9/1969 | Kast | 137/514.5 |
| 3,993,093 | 11/1976 | Mokveld | 137/484.6 |
| 4,228,820 | 10/1980 | Deminski | 137/514.5 |

FOREIGN PATENT DOCUMENTS

| | | | |
|---|---|---|---|
| 249615 | 2/1964 | Australia | 137/514.5 |
| 577825 | 6/1946 | United Kingdom | 137/514 |

Primary Examiner—Alan Cohan
Assistant Examiner—John A. Rivell
Attorney, Agent, or Firm—W. G. Fasse; D. H. Kane, Jr.

[57] ABSTRACT

A nonreturn piston slide valve has an inner housing operatively held in an outer housing and a spring operated piston operatively held in the inner housing for cooperation with a valve seat. A flow passage is formed between the piston face and the valve seat when fluid flows through the valve in the intended direction. When the fluid flow direction is reversed, the valve closes. In order to prevent so-called flutter movements of the piston the piston side wall is provided with a number of apertures through which the inner volume of the inner valve housing may communicate with the fluid flow. The apertures move with the piston to facilitate rapid opening of the valve during a first portion of a valve opening piston stroke. During a second end portion of a valve opening piston stroke the apertures pass into the inner housing thereby braking or dampening the movement of the piston at the end of the stroke to prevent slamming.

9 Claims, 6 Drawing Figures

NONRETURN PISTON SLIDE VALVE

CROSS-REFERENCE TO RELATED APPLICATION

This application is a continuation-in-part of U.S. patent application Ser. No. 037,054, filed on May 8, 1979. As to common subject matter applicant claims the convention priority date of Federal Republic of Germany Patent Application P 2,821,255.7, filed on May 16, 1978. The parent application U.S. Ser. No. 037,054 has now become abandoned.

BACKGROUND OF THE INVENTION AND PRIOR ART STATEMENT

The present invention relates to a nonreturn piston slide valve wherein a slide piston forms the valve closure member. The valve comprises an outer housing of substantially rotational symmetry. Centrally in the outer housing there is arranged a streamlined inner housing also of substantially rotational symmetry. The inner housing is held in the outer housing by connecting lands thereby forming a substantially free ring space for the flowing medium. A valve seat is provided in the ring space and the valve seat is closable by a slide piston biassed by a spring and coaxially arranged in the inner housing. The spring bias is effective against the flow direction to close the valve when the flow direction is reversed or when the flow is overcome by the bias of the spring. The flow passage may be shaped in such a manner that the flowing medium is initially accelerated and then again decelerated.

In a known slide piston valve the piston is operated by means of a bellows made of an elastic material. The bellows is closed on all sides and rests with its surface against the inside surface of the hollow inner valve housing and against the piston. The bellows end opposite the end in contact with the piston is secured to the valve housing. The valve is closed by the piston in response to introducing a pressure medium into the bellows. In order to prevent the build up of a counter pressure behind the piston around the wall of the bellows, the wall of the inner valve housing is provided with one or several openings.

A valve of the just described type may be used in principle also as a nonreturn valve if the function of the bellows is omitted. The piston closes the valve under the spring bias force against the valve seat seal in response to a reduction of the flow volume or in response to a reversal in the flow direction.

It is a well known phenomenon that nonreturn valves are subject to an undesirable or troublesome flutter movement of the piston, especially when the flow passage between the piston and the valve seat is narrow or when the flow volume is small.

In order to reduce such flutter movements in a slide piston valve as described above it has been suggested heretofore to provide the inner housing with one or several apertures in the range of the maximum flow speed of the flowing medium as shown in my U.S. Pat. No. 3,993,093. According to this suggestion the flowing medium is exposed to a reduced pressure in the closed inner portion of the inner valve housing relative to the pressure of the flowing medium upstream or downstream of the inner valve housing. The reduced pressure is effective on the inside of the piston and against the pressure of the spring. Thus, it is possible to use a relatively strong or stiff spring. If now the volume of the flowing medium is reduced, the pressure inside the inner valve housing also becomes smaller thereby correspondingly reducing its effect on the piston and the counter pressure of the spring. Thus, the spring presses the piston under its own force against the seal of the valve seat in the outer valve housing. In this manner it is intended to prevent the generation of an oscillating piston movement.

Extensive tests made with the known slide piston valves have shown that the ejecting effect was rather nonuniform as a function of the piston position, especially it was not sufficiently effective when opening the valve in its initial phase. It was shown, that the pressure in the flow passage corresponded to the pressure inside the inner valve housing so that initially the pressure difference was insufficient. Further, a secondary flow could be observed in the partially opened position of the piston inside the housing behind the apertures. Such secondary flow was related to the eddys occurring in the flow passage in the area of the narrowest flow cross-sectional area between the outer jacket surface of the piston extending out of the inner valve housing and the outer surface of the inner valve housing.

The closest prior art known to applicant is applicant's own U.S. Pat. No. 3,993,093 referred to above, and the Shaw British Pat. No. 577,825. The present invention provides a significant advance over the check valve described in applicant's previous U.S. Pat. No. 3,993,093 by locating the apertures for the inner housing in the wall of the valve piston. In applicant's previous check valve the apertures were formed in stationary position through the inner housing to communicate pressure and prevent oscillating movements of the piston. According to the present invention the placement of the apertures for movement with the valve piston affords additional features and advantages including rapid valve opening followed by a hydraulic breaking or damping action as the valve piston reaches the fully open position.

The Shaw British Pat. No. 577,825 does not describe a nonreturn piston slide valve or check valve as provided by the present invention. The present invention contemplates a nonreturn valve, which is normally open in response to normal flow in a channel. When the flow rate or pressure falls below a predetermined value, the valve closes to prevent a reverse flow of the medium. Shaw discloses a pressure relief safety valve which is normally closed and which must open in response to pressure. Thus, there is a basic functional difference between the valve of claim 1 of the present application and the valve according to British Pat. No. 577,825.

Furthermore, the openings or apertures in the valve sleeve of the Shaw reference are different in structure and function from the aperture openings in the valve piston in the present invention. The openings or apertures of Shaw do not function to avoid piston vibration. Shaw provides annulus E and annulus F for such purposes. The openings in the valve sleeve of Shaw are required to permit the opening of the valve. When the valve piston A moves from the closed to the open position the volume D inside the cylinder is reduced. It is therefore necessary to provide a pressure relief aperture for outflow of fluid as a result of the reduction in volume.

On the other hand, the apertures of the present invention serve to communicate the low pressure from the annular Venturi-like flow path around the valve to the inner space of the inner housing. This beneficial communication of low pressure throughout most of the stroke or movement of the piston facilitates rapid opening of the valve. Furthermore, the apertures are advantageously positioned in the piston wall to pass into the inner housing for damping or breaking piston motion toward the end of the stroke. This avoids undesirable slamming of the valve piston during opening.

The Shaw British Patent does not include a unitary piston head and piston wall as required by the present invention. The apertures in Shaw are formed in a separate sleeve beneath the piston head. In the present invention the apertures are formed in the piston wall itself for exposure to the maximum flow zone during most of the stroke and for passing into the inner housing at the end of the stroke. Thus, the safety pressure relief valve of Shaw performs a different function from the nonreturn valve or check valve of the present invention. Because of the different structure it cannot achieve the advantages which the valve piston apertures of the present invention provide in cooperation with the inner and outer housing of the valve.

OBJECTS OF THE INVENTION

In view of the above it is the aim of the invention to achieve the following objects singly or in combination:

to provide a nonreturn valve of the type described wherein oscillating movements of the piston are avoided in any piston position;

to especially avoid secondary flows inside the inner valve housing so as to prevent the impairing of the ejector effect by such secondary flows;

to provide a nonreturn slide piston valve which will be free of flutter movements regardless of the type of flowing medium so that gaseous or liquid media may flow throught the valve;

to provide a piston check valve which opens rapidly during the first part of the piston stroke and which introduces a braking action or damping action near the end of the opening stroke; and to adapt the shape of the flow channel operating as an ejector, to the physical characteristics of the respective flowing medium.

SUMMARY OF THE INVENTION

According to the invention there is provided a nonreturn check valve of the slide piston type in which the piston is provided at least with one radially extending aperture located in such a position that the aperture effectively connects the flow passage in the area of the maximum throughflow speed with the inner volume of the inner valve housing. The arrangement of the apertures directly in the piston wall itself prevents the formation of a troublesome secondary flow in any desired position of the piston because the aperture or apertures necessarily participate in any position changes of the piston. Thus, the flow conditions inside the valve housing remain unchanged in principle.

According to an embodiment of the invention the radially extending apertures comprise slots and/or bores uniformly distributed over the circumference of the piston jacket portion and located in a common plane.

To make sure that the apertures are fully effective in any intermediate piston position the invention teaches placing the radially extending apertures in a zone near the junction between the facing end of the piston and the jacket or wall of the piston.

In particular, the valve piston comprises a unitary piston head or face and piston side walls. The apertures are formed in the wall of the piston adjacent to the piston head. Furthermore, the apertures are advantageously located or positioned to expose the space within the inner housing to the zone of maximum flow speed in the annular flow passage between the outer and inner housing during most of the piston stroke. Toward the end of the opening piston stroke however, the apertures pass into the inner housing, closing the aperture channel between the space inside the housing and the annular valve flow passageway. As a result, at the end of the opening piston stroke hydraulic braking or damping decelerates the motion of the valve piston avoiding undesirable slamming of the valve upon opening.

Thus, according to the present invention, apertures communicating between the inside of the inner housing and the flow passageway are located in the wall of the unitary piston for movement with the piston. The apertures may therefore perform a number of advantageous functions in combination not found in the prior art: preventing oscillating movements of the piston and secondary flow within the inner housing; facilitating rapid opening of the valve; and providing a braking or damping of the movement of the valve piston during the end portion of the opening stroke of the valve piston.

While the valve of the present invention may assume a variety of configurations, in the preferred embodiment the cross-sectional configuration of the outer housing and valve seat, the inner housing, and the valve piston head or face are selected to define an efficient hydrodynamic annular flow path. This may be adapted to the characteristics of the fluid passing through the channel in which the check valve is located. In one preferred example, the inner housing of the valve assumes a "teardrop" or "raindrop" like configuration while the outer housing provides a complementary shape defining the annular flow passageway around the inner housing. In whatever configuration, the valve piston is operatively supported in sliding relationship with the inner housing for cooperation with the valve seat in the outer housing when the valve is closed. In its retracted or open position the valve position head or face merges with the wall of the inner housing to provide a continuous hydrodynamic surface for passage of fluid around the inner housing.

In the extended valve closing position apertures in the wall of the piston adjacent the head allow communication of fluid and pressure between the inner space of the inner housing and the zone of maximum flow speed in the annular passageway. The apertures thereby enhance rapid opening and dissipate oscillatory motion or secondary flows. The apertures or openings are, however, closed off by the inner housing at the end of the opening stroke to afford the beneficial braking action, which is also effective at the beginning of a valve closing piston movement as long as the apertures are still covered by the inner housing due to the disclosed location of the apertures.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
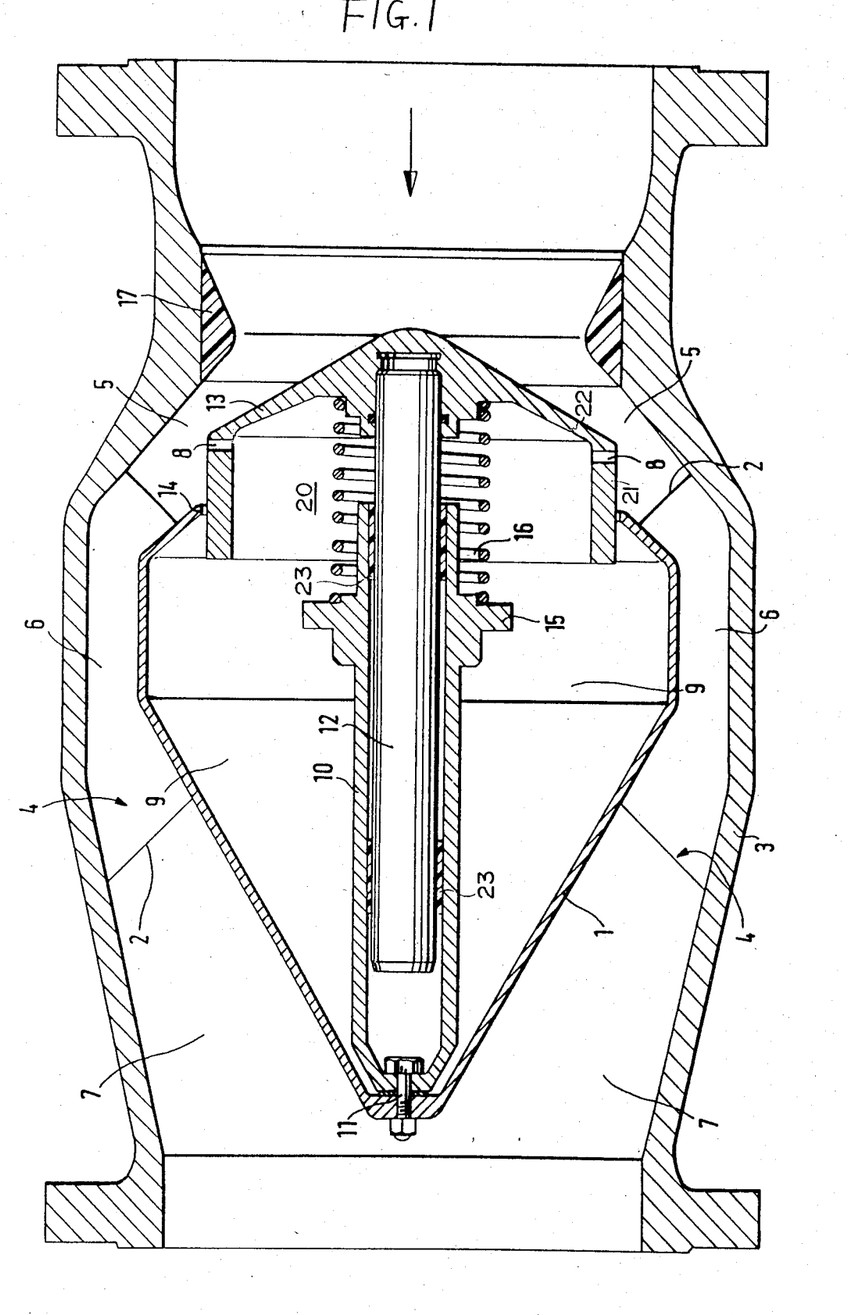
FIG. 1 is a simplified sectional view through a valve according to the invention, wherein the section extends along the longitudinal axis of the valve and the valve piston is shown at an intermediate position between fully closed and fully opened so that apertures 8 in the piston wall are exposed to the zone of maximum flow.

An inner valve housing 1 having a more or less streamlined shape is held by means of lands 2 in a central position in an outer valve housing 3 of the nonreturn valve. Both housings have a shape of substantially rotational symmetry. A flow passage 4 is formed between the inner valve housing and the outer valve housing. The flow passage is constructed so that in the zone 5 near the valve seat 17 the flow speed of a medium flowing in the direction of the arrow is increased in said zone 5 to form a maximum flow speed zone due to a venturi action. In the zone 6 the speed remains substantially constant and in the zone 7 the flow speed is diminished. Preferably, the zone 7 is constructed as a diffuser zone.

A valve slide piston 20 has a valve seat closing front face 13 and a side wall or jacket 21. The front face 13 cooperates with the valve seat 17 for closing the valve under the pressure of the spring 16 when the flow direction is reversed or when the flow pressure is reduced below a value smaller than the biasing force of the spring 16.

Figure 2:
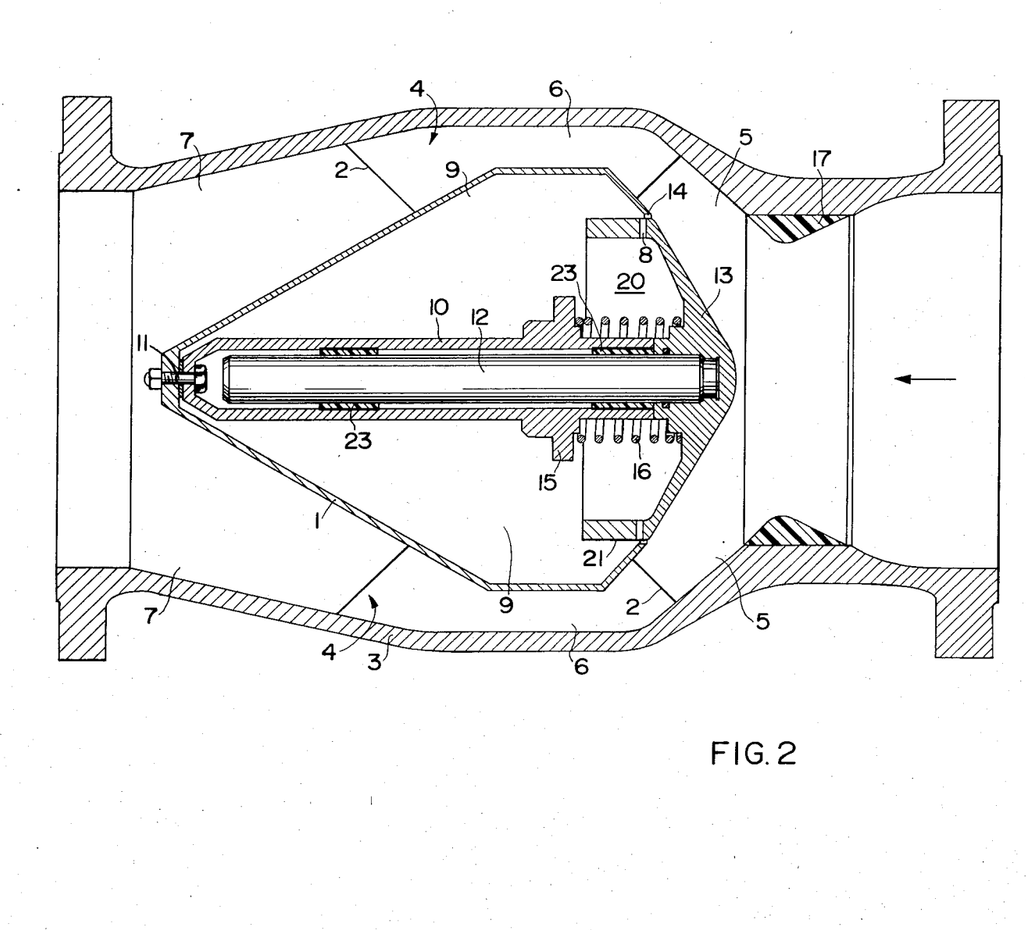
FIG. 2 is a similar sectional view through the valve of FIG. 1 with the valve piston in the fully opened position, so that the piston wall apertures 8 have passed into the inner housing of the valve.

According to the invention apertures 8 extend radially inwardly and through the side walls of the piston jacket 21 thereby connecting the flow passage zone 5 with the interior 9 of the inner valve housing 1. These apertures or passages 8 may be uniformly distributed around the circumference of the piston jacket 21 and are preferably located adjacent the junction 22 between the front face 13 and the jacket 21 of the piston 20. Thus, the apertures 8 in the form of slots or holes or the like communicate the inside of the inner housing 1 with the maximum flow speed zone 5 in substantially all possible positions of the piston 20 except when the apertures 8 enter into the inner housing as shown in FIG. 2 for achieving the above outlined advantages of the invention.

A tubular bushing or sleeve 10 is secured inside the inner valve housing 1 by means of a nut and bolt 11. A piston rod 12 is slidably supported by means of seals 23 inside the sleeve 10 for axial movement in response to the action of the spring 16 and the pressure exerted by the flowing medium. The piston 20 is conventionally secured to the free end of the piston rod 12. The piston jacket 21 has an outer diameter adapted to the diameter of the opening 14 in the inner valve housing 1 which permits the sliding movement of the piston relative to the inner hosuing 1. However, a special seal is not necessary between the inner housing 1 and the jacket 21 of the piston.

The above mentioned helical spring 16 rests on the one hand against a solid flange 15 of the sleeve 10 and presses against the inner surface of the piston. The bias of the spring 16 is selected so that the front face 13 will be securely pressed against the valve seat 17 in the closed position of the nonreturn valve.

In the shown position of FIG. 1 the valve is partially opened and the helical spring 16 is still subject to a substantial loading or tension which is counteracted by the reduced pressure inside the inner housing 1 resulting from the venturi action of the maximum flow speed zone 5 through the apertures 8.

As mentioned, the front face 13 of the piston 20 rests against the valve seat 17 in the closed position of the valve. The valve seat 17 is secured inside the outer valve housing by conventional means not shown. However, the valve seat 17 is easily replaceable by a similar valve seat but having a different flow configuration whereby the valve is easily adapted to the physical characteristic values of the medium flowing through the valve. Thus, it is possible to increase the ejector effect of the flow passage by the flow cross-sectional shape of the valve seat 17. Further, the present valve has the advantage that it may be used for a wide range of media including gaseous and liquid media. The flow volume as such is not limited. However, as mentioned, it is desirable to adapt the shape of the flow channel which forms the ejector to the physical characteristic values of the respective flowing medium. Such adaptation may, as mentioned, be easily accomplished by the shape of the valve seat 17.

The valve of FIG. 1 is shown with the valve piston 20 at an intermediate position in its stroke between fully closed and fully opened. Thus, the side wall 21 of the piston, and the piston wall apertures 8 are exposed to the annular maximum flow passageway 5 defined between the inner and outer housing. In the illustration of FIG. 2 the valve is shown with the piston 20 in fully opened position. In this position the outer surface or front face 13 at the head of the piston merges substantially continuously with the wall of the inner housing to provide a streamlined surface over which the fluid passes. The numbering of elements in FIG. 2 corresponds with that of FIG. 1.

Just prior to reaching the fully opened position the apertures 8 in the side wall 21 of the piston 20 are already located within the inner valve housing 1. Thus during the end portion of the opening stroke of the piston 20 a substantial braking effect takes place as the channel from the inner valve housing to the annular flow passageway is blocked. This braking effect also takes place at the beginning of a valve closing piston movement to limit the initial valve closing speed of the piston.

Figure 3:
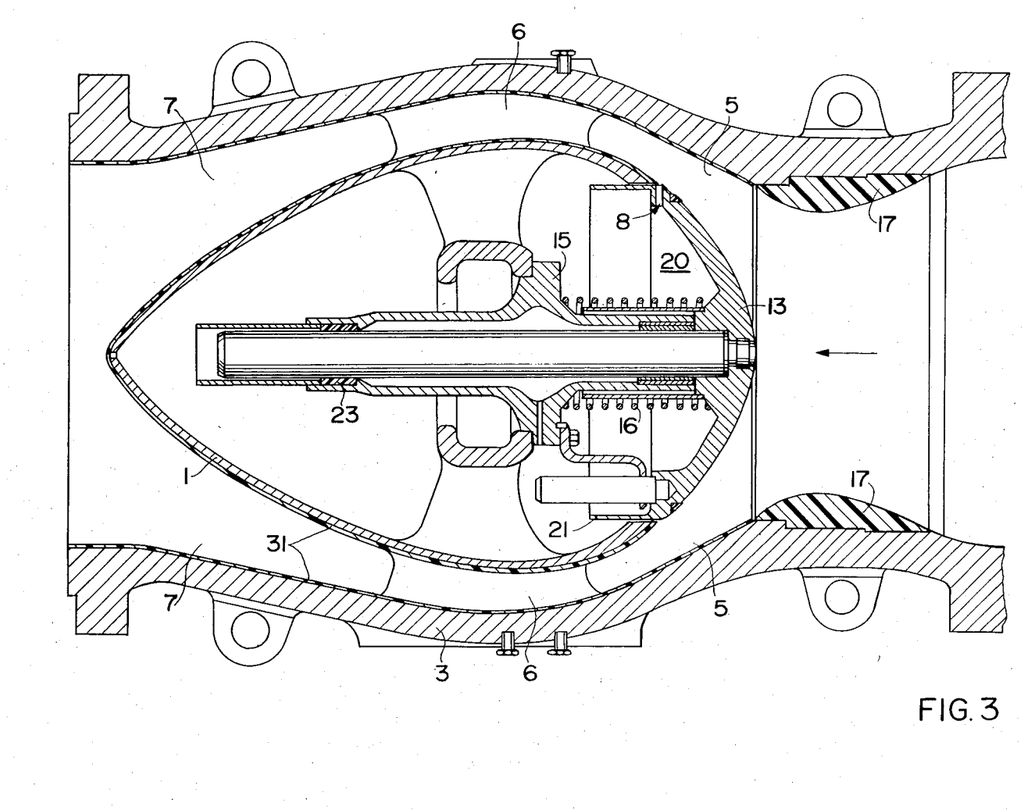
FIG. 3 is a simplified sectional view of another valve according to the present invention, wherein the section extends along the longitudinal axis of the valve showing the teardrop configuration of the inner valve housing.

The check valve illustrated in FIG. 3 is similar in structure and function to the valves of FIGS. 1 and 2 and the corresponding elements of the valve are similarly numbered. In the valve of FIG. 3, however, the inner valve housing 1 is formed in a hydrodynamic "teardrop" type configuration. The wall of the outer housing 3 is also smoothly curved to provide a complementary surface in the vicinity of the inner valve housing 1. Thus, the inner and outer valve housings define an annular flow passageway with smoothly converging surfaces at the upstream end and smoothly diverging surfaces at the downstream end in the vicinity of the valve. Smooth flow or laminar flow through the valve may be enhanced by a coating on the surfaces of the annular flow passageway. For example, a coating 31 of Resistoplast 590 may be used.

Figure 4:
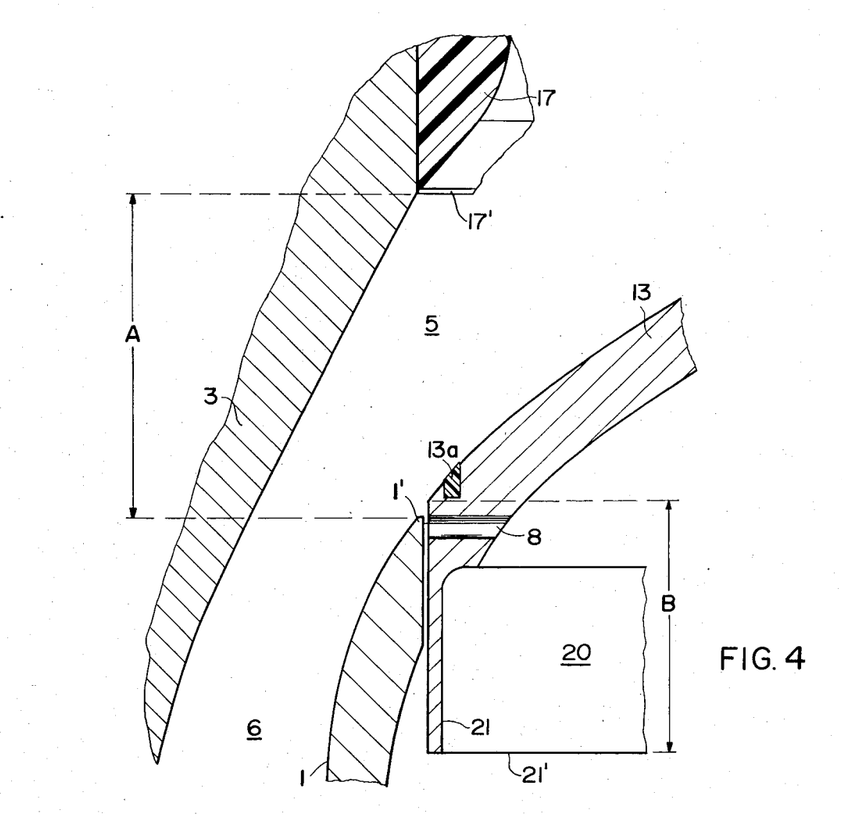
FIG. 4 is a fragmentary detailed section of the valve of FIG. 3 showing the spacial relationships of the unitary piston head and piston wall, aperture formed in the piston wall, inner housing, outer housing, and valve seat with which the piston head cooperates.

The valve of FIG. 3 is shown in the fully opened position with the piston 20 fully retracted. In this position the front face or head 13 of the piston smoothly merges with the inner housing to form the "teardrop" configuration. As shown in the detail of FIG. 4, the aperture or channel 8 is similarly formed in the side wall 21 of the piston 20 immediately adjacent and below the front face or head 13 of the piston. In the fully opened position with the piston retracted and also just prior to full piston retraction, the aperture or channel 8 no longer communicates with the annular flow passageway indicated at 5 and 6 defined between the outer housing 3 and inner housing 1. Thus, as the piston nears the end of the opening stroke the aperture or channel 8 passes within the inner valve housing 1. Communication between the inside of the inner housing and the flow passageway is blocked, whereby a damping or braking action results at the end of the opening stroke due to pressure increase in the inner housing 1.

In the closed position, the front face 13 of the piston 20 contacts the valve seat 17 formed on the outer housing 3. A sealing member 13a on the front face 13 of the piston 20 may be provided as a ring on the piston face to the valve seat 17 in a sealing relationship.

As further shown in FIG. 4 the relative dimensions of the valve are such that the axial spacing A between the top edge 1' of the inner housing 1 is spaced from the bottom edge 17' of the valve seat 17 a distance A which is larger than the axial length B of the axial piston wall 21, whereby in the valve closing position of the piston 20 a ring gap is formed between the lower end 21' of the piston 20 and the top edge 1' of the inner housing 1. This ring gap facilitates the rapid communication between the space in the inner housing 1 and the maximum flow speed zone 5 at the beginning of an opening stroke of the piston 20, whereby the initial opening of the valve takes place very rapidly until the ring gap is closed by the movement of the piston 20 into the inner housing 1. The opening movement is still rapid as long as the apertures 8 are effective and the above mentioned braking action is effective when the apertures 8 move into the inner housing 1 during the end portion of the opening stroke of the piston 20 as shown in FIG. 4. Incidentally, the spacing A is also larger than the spacing B in the embodiment of FIG. 2.

Figure 5:
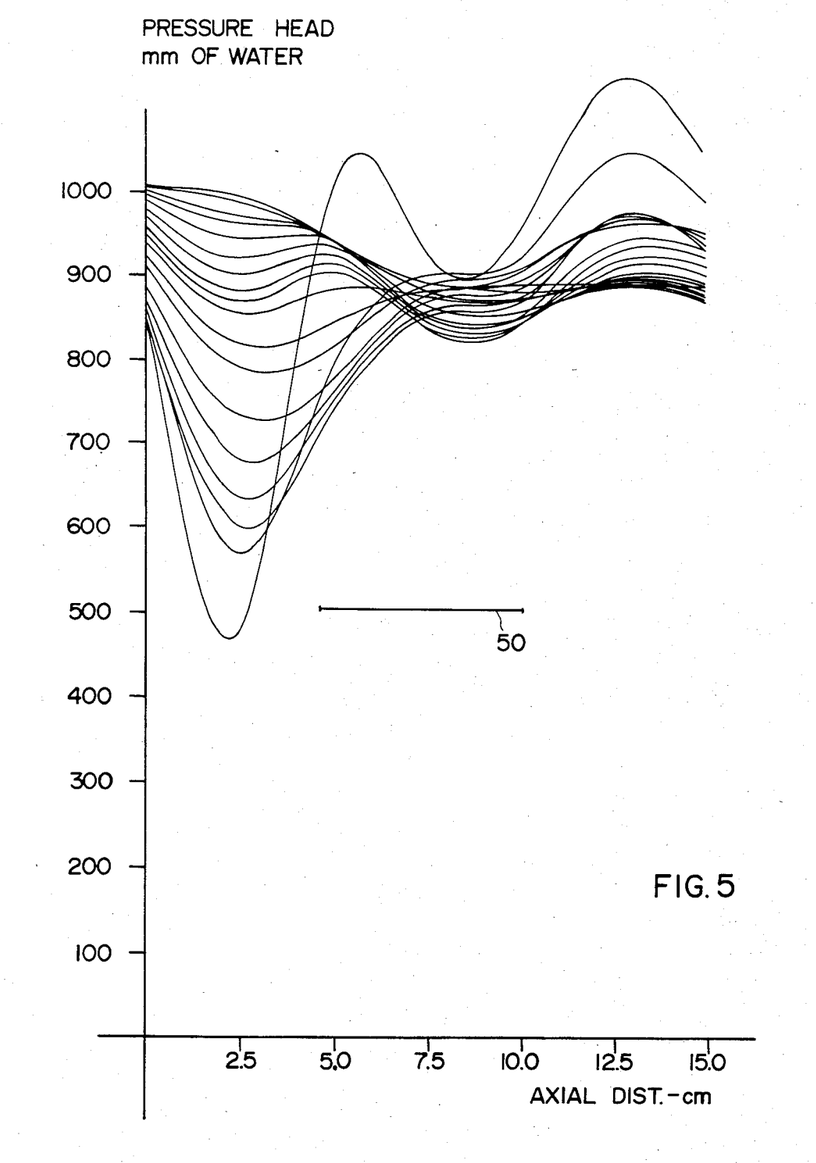
FIG. 5 is a graph of pressure distribution along the wall of the outer housing in the vicinity of the operative portions of the valve of FIG. 3.

FIG. 5 shows a graph with plots of pressure distribution along the wall of the outer housing in the vicinity of the valve for different measured flow rates. The line 50 included on the graph represents the range of the valve piston stroke along the region of measurements. An important conclusion from the data presented on this graph is that the pressure at the edge of the piston varies but little for this shape or valve configuration. In fact, the pressure at the edge of the piston decreases as the stroke increases up to approximately 80% of the full stroke and thereafter the pressure at the edge of the piston head increases. As a result, the pressure communicated through the inside of the inner valve housing through the apertures or channel 8 assists in the opening of the valve for approximately 80% of the stroke and thereafter to a suitable degree tends to resist opening the valve. Increased hydrodynamic force over the front face of the piston, however, increases rapidly during this phase and the valve thus opens the remaining 20% of the stroke in a positive manner. Thus, the "teardrop" configuration of the valve of FIG. 3 further assists in the rapid opening of the valve during the initial 80% of the stroke of the valve piston. During the final 20% of the opening stroke of the piston, the configuration provided in FIG. 3 assists in damping the piston movement.

Figure 6:
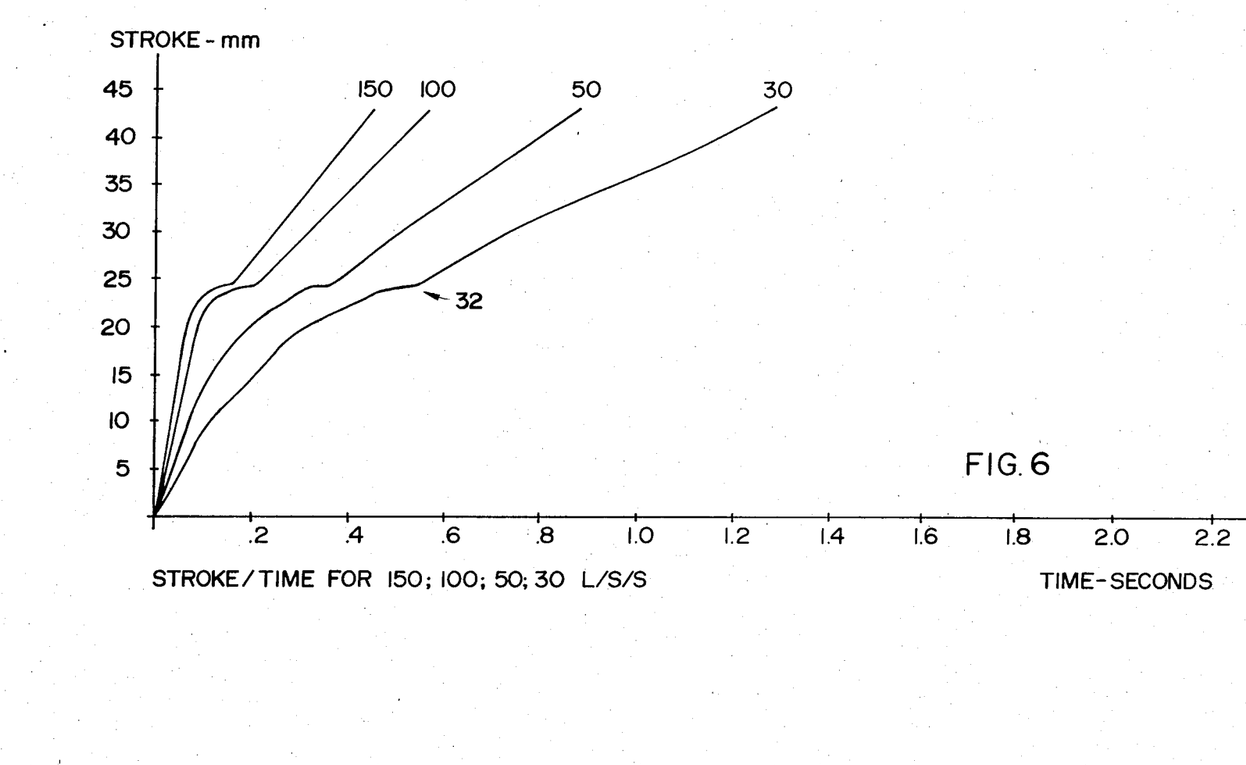
FIG. 6 is a graph of the valve piston stroke versus time response for four different rates of increase of flow, namely, 30, 50, 100, and 150 liters per second per second, through the valve of FIG. 3.

This surprising phenomenon afforded by the valve configuration of FIGS. 2 and 3 including FIG. 4 under dynamic conditions is further illustrated in the graph of FIG. 6. This graph plots data for the valve during the opening mode or stroke and shows the stroke response as a function of time for four different rates of increase of flow applied to the valve. The rates of increase of flow vary from zero linearly and have values of 30, 50, 100 and 150 liters per second per second. It is apparent from the graph that the valve opens rapidly during the first 23 mm of the overall stroke of 43 mm due to the above mentioned ring gap which is decreasing during the initial portion of the valve opening stroke of the piston 20 between the lower end 21' of the piston 20 and the top edge 1' of the inner housing 1. Thus, the configuration of the valve in FIGS. 2 and 3 produces a very small dash pot damping effect and relatively high piston speeds during the initial portion of the stroke. However, as the ring gap and the apertures 8 or channels or slots formed in the piston wall 21 become covered by the inner housing, a substantial hydraulic damping 32 is applied which almost stops the valve. Thereafter the valve continues to the fully opened position in a linear manner. The valve closure is dependent upon the strength of the spring 16 and the hydrodynamic forces tending to oppose the spring and maintain the valve open. These hydrodynamic forces are in general proportional to the square of the velocity of flow approaching the valve. A feature and advantage of the "teardrop" configuration of the valve body as shown in FIG. 3 is that the hydrodynamic forces on the front of the valve are reduced and the forces tending to open the valves are clearly dependent upon the square of the velocity of the flow. Thus, the strength of the spring 16 is fundamental in determining the maximum rate of change of flow which the valve can follow without closing or slamming shut. In the particular example of FIG. 3 it was found that a rate of change of flow through the valve of approximately 60 liters per second per second was the maximum rate of change which could be accommodated before the onset of valve slam or closure.

In a particular example embodiment of the type shown in FIG. 3, a valve with a piston stroke of 69 mm was provided. The spring 16 provided a spring force of 92–94 Newtons in the fully closed (spring extended) position and 213–218 Newtons in the fully open (spring compressed) position.

Near the end of an opening stroke of the valve piston at 67.5 mm the flow rate Q was 207.1 liters/sec., pressure drop across the valve $\Delta P$ was 53.6 millibar and the pressure $P_{h.v.}$ inside the inner housing relative to the upstream pressure $P_1$ was $P_1 - P_{h.v.} = 200$ millibar. At the full stroke 69 mm the flow rate jumped to 406.8 liters/sec., pressure drop $\Delta P$ was 211 millibar and the relative pressure in the inner housing $P_1-P_{h.v.}$ was 594 millibar. The significant change 32 during the end portion of the stroke is, the result of the valve and aperture configuration of the present invention, which is further illustrated in the results of Table 1.

Although the invention has been described with reference to specific example embodiments, it will be appreciated, that it is intended to cover all modifications and equivalents within the scope of the appended claims.

TABLE 1

| Results of measurements, valve opening and closing | | | |
|---|---|---|---|
| Valve stroke (mm) | Q (l/s) | ΔP (millibar) | $P_1-P_{h.v.}$ (millibar) |
| 47.8 | 85.24 | 25.2 | 94.6 |
| 54.2 | 100.2 | 20.0 | 103 |
| 61.5 | 119.9 | 20.2 | 112 |
| 64.9 | 140.7 | 26.0 | 125 |
| 66.9 | 174.7 | 39.0 | 160 |
| 67.5 | 207.1 | 53.6 | 200 |
| 68.5 | 322.2 | 132 | 396 |
| 69.0 | 406.8 | 211 | 594 |
| 68.1 | 210.8 | 55.2 | 186 |
| 64.1 | 110.0 | 16.3 | 81.3 |
| 57.9 | 88.90 | 12.6 | 70.5 |
| 50.4 | 73.74 | 14.8 | 63.6 |

I claim:

1. A nonreturn piston slide valve having a longitudinal flow axis, said valve being normally open in response to flow of a medium in a desired direction through the valve, comprising inner housing means confining an inner space, outer housing means and means operatively securing said inner housing means coaxially in said outer housing means to form an annular flow passage coaxially through the valve, said annular flow passage forming a venturi action zone of maximum flow speed, said outer housing means comprising valve seat means adjacent the annular flow passage, said valve seat means defining a plane extending perpendicularly to said longitudinal flow axis, piston means having a valve closing piston face and piston wall means extending substantially coaxially to said longitudinal flow axis, said inner housing means having an axially facing opening (14), said piston means being coaxially supported inside said inner housing means in sliding relationship with said inner housing means through said axially facing opening (14) for cooperation with said valve seat means, spring means held in said inner housing means for biasing said piston means against said valve seat means to close the valve in response to a flow direction opposite to said desired flow direction, said spring means being constructed and arranged so that the valve piston means remains in the normally open position during flow through the valve in the desired direction, and aperture means (8) extending substantially radially to said flow axis through said piston wall means adjacent the piston face, said aperture means (8) operatively connecting said inner space of said inner housing with said maximum flow speed venturi action zone during a substantial first portion of a valve opening stroke of said piston means (21), while said aperture means (8) are moving with the piston means for avoiding secondary flows inside said inner housing means, for preventing oscillating movements of the piston means in any position of the piston means, and for facilitating a rapid opening of the valve, said opening (14) of said inner housing means being located relative to said aperture means (8), so that said aperture means (8) in the piston wall means (21) pass inside the inner housing means only during a second, short end portion of said valve opening stroke, thereby providing a pronounced hydraulic damping or braking action (32) during the short end portion of the valve opening stroke of the piston means, said aperture means (8) also limiting an initial valve closing speed of said piston means as long as the aperture means are still covered by the inner housing means at the beginning of a valve closing piston movement.

2. The valve of claim 1, wherein said aperture means are slots distributed about the circumference of said piston wall means.

3. The valve of claim 1, wherein said aperture means are holes distributed about the circumference of said piston wall means.

4. The valve of claim 1, wherein said aperture means comprise a plurality of openings uniformly distributed about the circumference of said piston wall means.

5. The valve of claim 1, wherein said piston wall means and said valve closing means of the piston means form a junction, said aperture means being arranged in said piston wall means substantially adjacent to said junction.

6. The valve of claim 1, wherein said valve piston means, said inner housing means, and said outer housing means have such a cross-sectional shape that said maximum flow speed zone is located just downstream of said valve seat means, said maximum flow speed zone being adapted to physical characteristics of a medium flowing through said valve.

7. The valve of claim 1, wherein said piston means and said inner housing means are shaped to form a teardrop configuration when the piston means is in the fully open position, and said outer housing means is formed with a configuration complementary to the teardrop configuration of said inner housing means and piston means thereby defining an annular flow passage through the valve smoothly converging in said maximum flow speed zone and diverging along a lower end of the inner housing means.

8. A nonreturn piston slide valve which is normally open in response to flow of a medium in a desired direction through the valve, comprising inner housing means of substantially teardrop configuration confining an inner space, outer housing means and means operatively securing said inner housing means in said outer housing means, said outer housing means having a configuration complementary to the teardrop configuration of said inner housing means to form a venturi type annular flow passage means through the valve smoothly converging upstream and diverging downstream of a portion of the inner housing means forming a zone of maximum flow speed, said outer housing means comprising valve seat means, piston means having a valve closing piston face means and axially extending piston wall means, said piston means being slideably supported in said inner housing means for cooperation with said valve seat means, spring means held in said inner housing means for biasing said piston means against said valve seat means to close the valve in response to a flow direction opposite to said desired flow direction, said spring means being constructed and arranged so that the valve piston means remains in the normally open position during flow through the valve in the desired direction, and aperture means (8) extending through said piston wall means adjacent the piston face means substantially in said zone of maximum flow speed, said aperture means operatively connecting said inner space of said inner housing with said maximum flow speed zone during a major initial portion of a valve opening stroke of said piston means for providing a rapid valve opening action, said aperture means (8) being located for movement into the inner housing means only during a short end portion of the valve opening stroke of the piston means for applying a braking action to the piston means during said short end portion of the valve opening stroke due to a pressure increase in the inner housing and for limiting an initial valve closing speed of said piston means as long as the aperture means are still covered by the inner housing means at the beginning of a valve closing piston movement.

9. The valve of claim 1 or 8, wherein a spacing between a lower edge of said valve seat means and a top edge of said inner housing means is larger than the axial length of said piston wall means, for providing a ring gap between the lower end of the piston wall means and the top edge of said inner housing means when said piston means is in a valve closing position.

* * * * *